United States Patent [19]
Agarwal et al.

[11] Patent Number: 5,981,017
[45] Date of Patent: Nov. 9, 1999

[54] MAGNETIC DISK HAVING A HEAT SINK LAYER ABOVE THE SUBSTRATE AND METHOD OF MAKING

[75] Inventors: Shashi B. Agarwal, Santa Clara; Debasis Baral, San Jose; Jih-Ping Peng, Cupertino, all of Calif.

[73] Assignee: Western Digital Corporation, Irvine, Calif.

[21] Appl. No.: 08/994,782

[22] Filed: Dec. 19, 1997

[51] Int. Cl.[6] .................................................. G11B 5/66
[52] U.S. Cl. .................. 428/65.3; 428/65.4; 428/65.5; 428/65.6; 428/65.7; 428/336; 428/694 T; 428/694 TS; 428/694 TP; 428/900; 427/128; 427/129; 427/130; 427/131
[58] Field of Search .................... 428/694 T, 694 TS, 428/694 TP, 900, 336, 65.3, 65.4, 65.5, 65.6, 65.7; 427/128–131

[56] References Cited

U.S. PATENT DOCUMENTS 5,314,745  5/1994  Okumura ............................ 428/336
5,381,396  1/1995  Tanaka et al. ....................... 369/116

*Primary Examiner*—Leszek Kiliman
*Attorney, Agent, or Firm*—Leo J. Young; Milad G. Shara

[57] ABSTRACT

A magnetic disk which includes a thin film magnetic layer resistant to thermal erasures caused by a rise in localized temperature in the disk due to head disk interference includes a substrate having a thermal diffusivity of less than about $2 \times 10^{-6}$ m$^2$/sec and a magnetic layer for storing information which is subject to erasure upon such use in localized temperature generated by the head disk interference. An underlayer below the magnetic layer is provided for orienting crystalline structure of the magnetic layer, and the heat sink layer directly above the substrate and directly below the underlayer has a single material such as chromium. The heat sink layer has sufficient thermal diffusivity and sufficient thickness for dissipating heat generated by the rise in localized temperature caused by head disk interference to prevent the erasure of stored information in the magnetic layer.

20 Claims, 5 Drawing Sheets

MAGNETIC DISK HAVING A HEAT SINK LAYER ABOVE THE SUBSTRATE AND METHOD OF MAKING

BACKGROUND OF THE INVENTION

1. Field of the Invention

This invention generally relates to magnetic recording media and more particularly to a magnetic disk having a thin film magnetic layer thereon resistant to thermal erasures of stored information.

2. Description of the Prior Art and Related Information

A huge market exists for hard disk drives for mass-market host computer systems such as servers, desktop computers, and laptop computers. To be competitive in this market, a hard disk drive must be relatively inexpensive, and must accordingly embody a design that is adapted for low-cost mass production. In addition, it must provide substantial capacity, rapid access to data, and reliable performance. Numerous manufacturers compete in this huge market and collectively conduct substantial research and development, at great annual cost, to design and develop innovative hard disk drives to meet increasingly demanding customer requirements.

Each of numerous contemporary mass-market hard disk drive models provides relatively large capacity, often in excess of 2 gigabytes per drive. Nevertheless, there exists substantial competitive pressure to develop mass-market hard disk drives that have even higher capacities and that provide rapid access. Another requirement to be competitive in this market is that the hard disk drive must conform to a selected standard exterior size and shape often referred to as a "form factor." Generally, capacity is desirably increased without increasing the form factor or the form factor is reduced without decreasing capacity.

Satisfying these competing constraints of low-cost, small size, high capacity, and rapid access requires innovation in each of numerous components and methods of assembly including methods of assembly of various components into certain subassemblies. Typically, the main assemblies of a hard disk drive are a head disk assembly and a printed circuit board assembly. The head disk assembly includes an enclosure including a base and a cover, at least one disk having at least one recording surface, a spindle motor for causing each disk to rotate, and an actuator arrangement. The disk typically includes a substrate, an underlayer, a magnetic layer for storing information, and an overcoat layer for protecting the disk. The printed circuit board assembly includes circuitry for processing signals and controlling operations.

Actuator arrangements can be characterized as either linear or rotary; substantially every contemporary cost-competitive small form factor drive employs a rotary actuator arrangement. The rotary actuator arrangement typically includes a head stack assembly, a pivot bearing cartridge, and a permanent magnet arrangement. The head stack assembly typically includes a body portion having a bore for receiving the pivot bearing cartridge, a coil portion extending from the body portion, at least one actuator arm extending from the body portion in an opposite direction from the coil portion, and a head gimbal assembly attached to the actuator arm. The head gimbal assembly typically includes a load beam attached to the actuator arm, a gimbal attached to the load beam and a head attached to the gimbal.

In operation, when reading and writing data from and to the disk, the disk is rotated rapidly by the spindle motor which causes the head to "fly" (hence, the term "flying head") over the recording surface of the disk. Once the head is positioned over a particular track, the head is then used to read or write data on that track. A problem arises from the fact that due to the close proximity of the flying head to the recording surface while the disk is rotating, head disk interferences may occur. Head disk interference includes direct contact between the flying head and disk such as when shock is applied to a disk drive. Head disk interference also includes the instance when a particle is trapped between the flying head and disk such the particle contacts the disk. Such head disk interferences produce frictional heating which momentarily raises the localized temperature of the disk. Such a momentary rise in localized temperature on the disk is referred to herein as a "flash temperature."

In disks having substrates which are good conductors of heat such as an aluminum substrate, flash temperatures do not pose a problem since such flash temperatures are relatively low. However, in a disk having an insulating substrate such as a glass substrate, flash temperatures, if high enough, may erase stored information in the magnetic layer since glass is a poor conductor of heat.

SUMMARY OF THE INVENTION

This invention can be regarded as a magnetic disk for use with a flying magnetic head, the disk and head subject to head disk interference which may cause an erasure of stored information on the disk generated by a rise in localized temperature in the disk. The disk includes a substrate having a relatively low thermal diffusivity, for example, less than about $2 \times 10^{-6}$ m$^2$/sec, a magnetic layer, an underlayer, and a heat sink layer. The magnetic layer is provided for storing information which is subject to erasure upon a rise in localized temperature which is generated by the head disk interference.

The underlayer below the magnetic layer is provided for orienting the crystalline structure of the magnetic layer and the heat sink layer is provided directly above the substrate and directly below the underlayer. The heat sink layer has a single material and has sufficient thermal diffusivity and sufficient thickness for dissipating heat generated by the rise in localized temperature caused by the head disk interference to prevent the erasure of stored information in the magnetic layer. The heat sink layer has a thermal diffusivity, for example, greater than $24 \times 10^{-6}$ m$^2$/sec.

More particularly, in accordance with this invention, the magnetic layer may have a thickness of between about 100 angstroms and about 300 angstroms and the heat sink layer may have a thickness of between about 100 angstroms and about 10,000 angstroms. These thicknesses are suitable when the substrate comprises glass and the heat sink layer comprises chromium, silicon carbide, diamond, aluminum, copper, or silver.

While the thickness of the heat sink layer suitable for this invention may be different for different disk materials, which will be hereinafter described in greater detail, it is important that the thickness is sufficient to prevent the flash temperature, due to head disk interference on the magnetic layer, from exceeding about 100° C.

This invention can also be regarded as a method of making a magnetic disk for use with a flying magnetic head, the disk and head subject to head disk interference which may cause an erasure of stored information on the disk generated by a rise in localized temperature in the disk. The method includes the steps of providing a substrate having a thermal diffusivity less than about $2 \times 10^{-6}$ m$^2$/sec and depositing a heat sink layer having a single material and having sufficient thermal diffusivity and sufficient thickness directly above the substrate.

An underlayer is deposited directly above the heat sink layer for orienting crystalline structure of a magnetic layer. A magnetic layer is deposited above the underlayer, the magnetic layer for storing information which is subject to erasure upon such rise in localized temperature generated by the head disk interference. The heat sink layer functions to dissipate heat generated by the rise in localized temperature caused by head disk interference to prevent the erasure of stored information in the magnetic layer. The heat sink layer has a thermal diffusivity, e.g. greater than $24 \times 10^{-6} m^2/sec$.

DETAILED DESCRIPTION OF A PREFERRED EMBODIMENT

Figure 1:
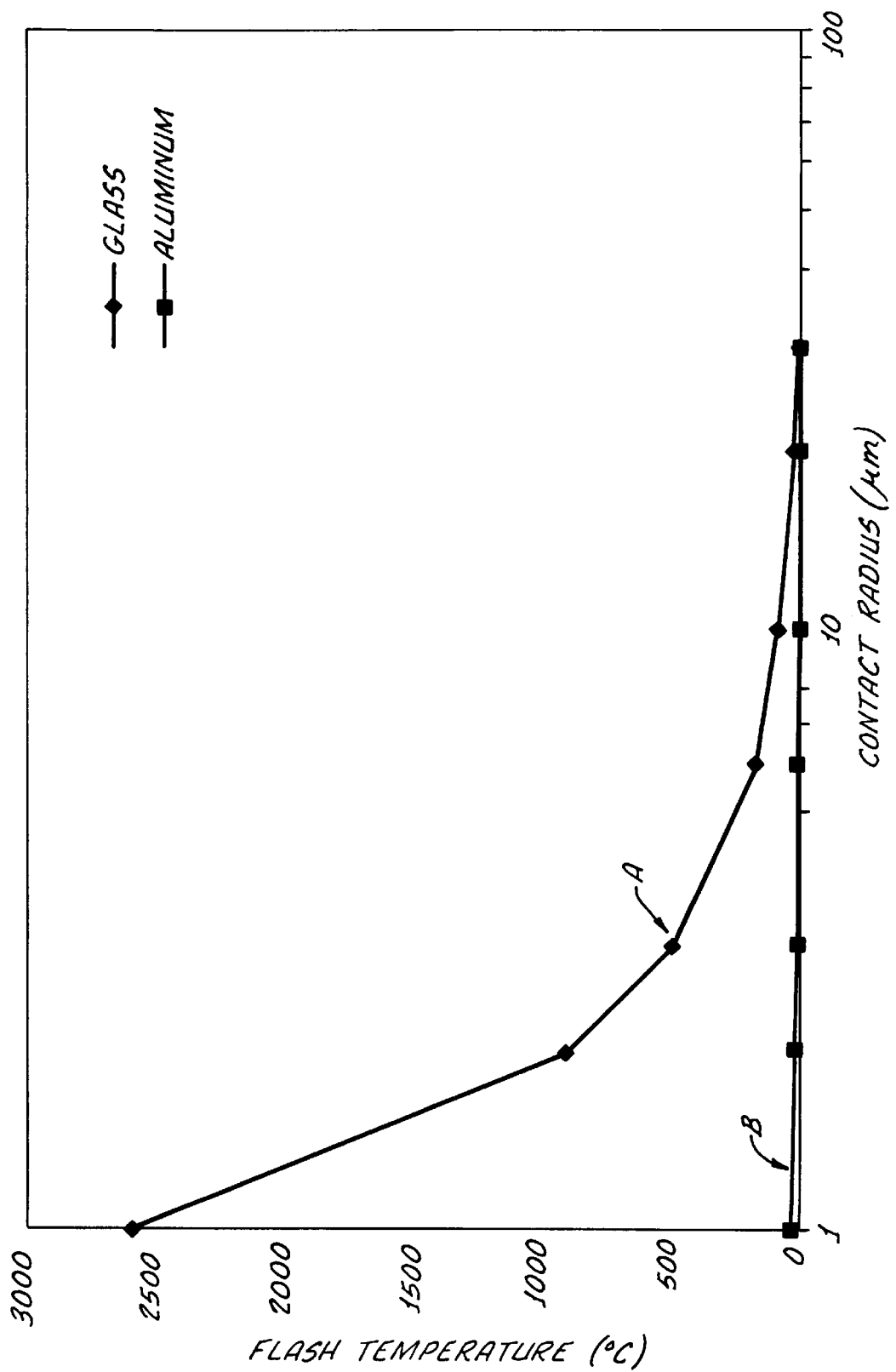
FIG. 1 are plots of calculated flash temperatures as a function of contact radius for a glass substrate disk and an aluminum substrate disk.

As hereinabove noted, the insulation properties of glass, when used as a substrate for a magnetic disk, gives rise to high flash temperatures caused by head disk interference which does not occur with a substrate such as an aluminum substrate. This effect is shown in FIG. 1 where plot A represents the flash temperature as a function of contact radius for a glass substrate disk and plot B represents the flash temperature as a function of contact radius for an aluminum substrate disk. As seen in FIG. 1, flash temperature for a glass substrate disk dramatically decreases as contact radius increases whereas flash temperature for an aluminum substrate disk remains relatively constant. The term "contact radius" refers to the radius of the surface of a particle which contacts the disk.

For comparison, the thermal diffusivity for glass is $0.39 \times 10^{-6} m^2/sec$, whereas thermal diffusivity of aluminum is $84 \times 10^{-6} m^2/sec$.

Figure 2A:
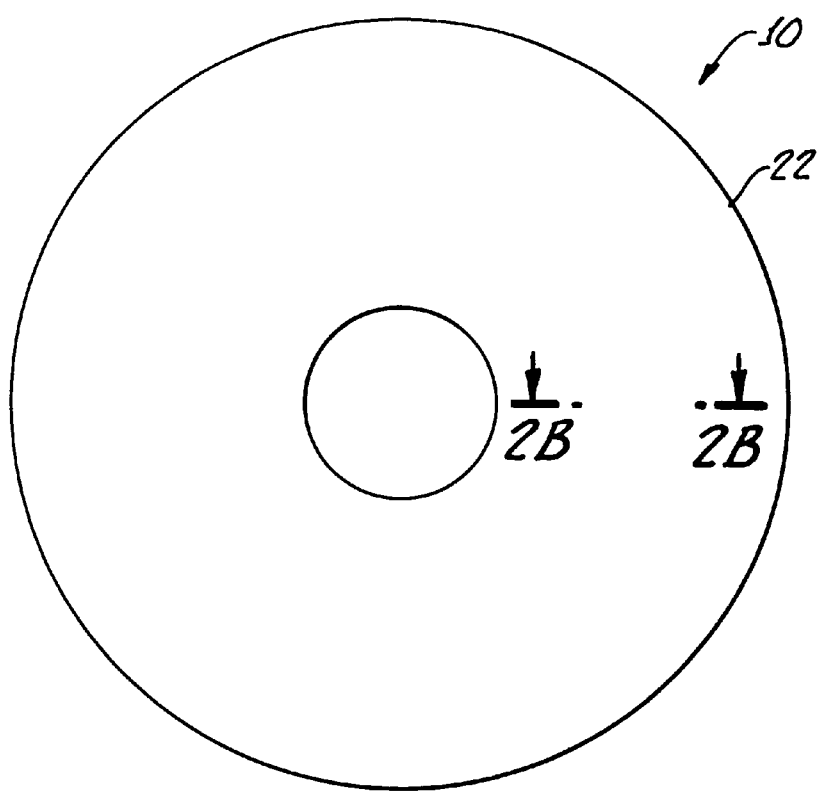
FIG. 2A is a plan view of a magnetic disk according to an embodiment of this invention.

With reference to FIG. 2A, magnetic disk 10 includes a recording surface 22. Typically, recording surface 22 is on both sides of the disk such that a disk includes two recording surfaces for storing information. Magnetic disk 10 may include an annular landing zone (not shown) near the inner diameter of the disk.

Figure 2B:
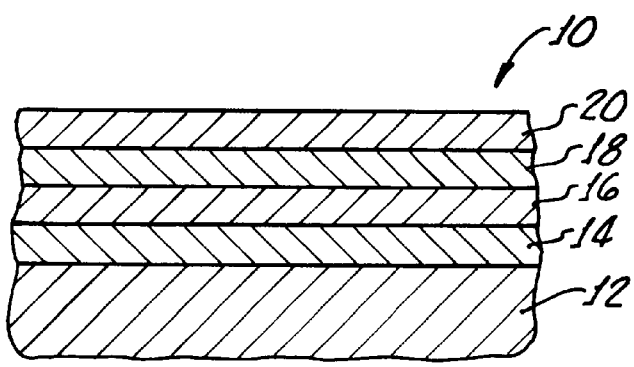
FIG. 2B is a partial cross sectional view of the magnetic disk of FIG. 2A.

With reference to FIG. 2B, there is shown, in partial cross section, a portion of magnetic disk 10 in accordance with this invention for use with a flying magnetic head (not shown), where the disk and head are subject to head disk interference which may cause an erasure of stored information on the disk generated by a rise in localized temperature in the disk.

Magnetic disk 10 includes a substrate 12, having a thermal diffusivity of less than about $2 \times 10^{-6} m^2/sec$, such as glass. The substrate 12 may be formed in any suitable manner. Magnetic disk 10 further includes a heat sink layer 14, an underlayer 16, a magnetic layer 18, and an overcoat layer 20. Magnetic layer 18 is provided for storing information which is subject to erasure upon such rise in localized temperature generated by a head disk interference. Suitably, magnetic layer 18 is formed from a magnetic material such as an alloy of cobalt, nickel, and chromium. Further, the magnetic layer 18 may be deposited in a suitable manner as will be hereinafter described in greater detail.

Underlayer 16 is provided below the magnetic layer 18 for orienting crystalline structure of the magnetic layer 18. Suitably, underlayer 16 is formed from chromium or a chromium alloy and may have a thickness of between about 200 angstroms to about 400 angstroms. It is important to appreciate that the thickness of the underlayer 16 is important to the crystal growth and perpendicular properties of the magnetic layer 18.

Heat sink layer 14 is disposed directly above the substrate 12 and directly below underlayer 16. Heat sink layer 14 has a single material such that the entire heat sink layer is made from the single material such as chromium. Heat sink layer 14 has sufficient thermal diffusivity and sufficient thickness for dissipating heat generated by the rise in localized temperature caused by the head disk interference to prevent the erasure of stored information in the magnetic layer 18. Heat sink layer 14 should be sufficiently thick to prevent a flash temperature, due to head disk interference, on the magnetic layer from exceeding about 100° C. Preferably, the single material has a thermal diffusivity greater than $24 \times 10^{-6} m^2/sec$.

Materials having such a thermal diffusivity include chromium, silicon carbide, diamond, aluminum, copper, silver, and gold. Preferably, magnetic layer 18 has a thickness between about 50 Angstroms to about 500 Angstroms, and heat sink layer 14 has a thickness between about 100 Angstroms to about 10,000 Angstroms. The thickness of the heat sink layer is dependent on the thermal diffusivity of the single material. For example, the thickness of a chromium heat sink layer would be significantly greater than the thickness of a diamond heat sink layer since chromium has a thermal diffusivity of $29 \times 10^{-6} m^2/sec$ and diamond has a thermal diffusivity of $1400 \times 10^{-6} m^2/sec$. Materials such as aluminum, silicon carbide, copper, silver, and gold all have greater thermal diffusivity than chromium.

Overcoat layer 20 may be disposed over the magnetic layer 18 for protecting the magnetic layer. Suitably, overcoat layer 20 may be formed from carbon.

Figure 3:
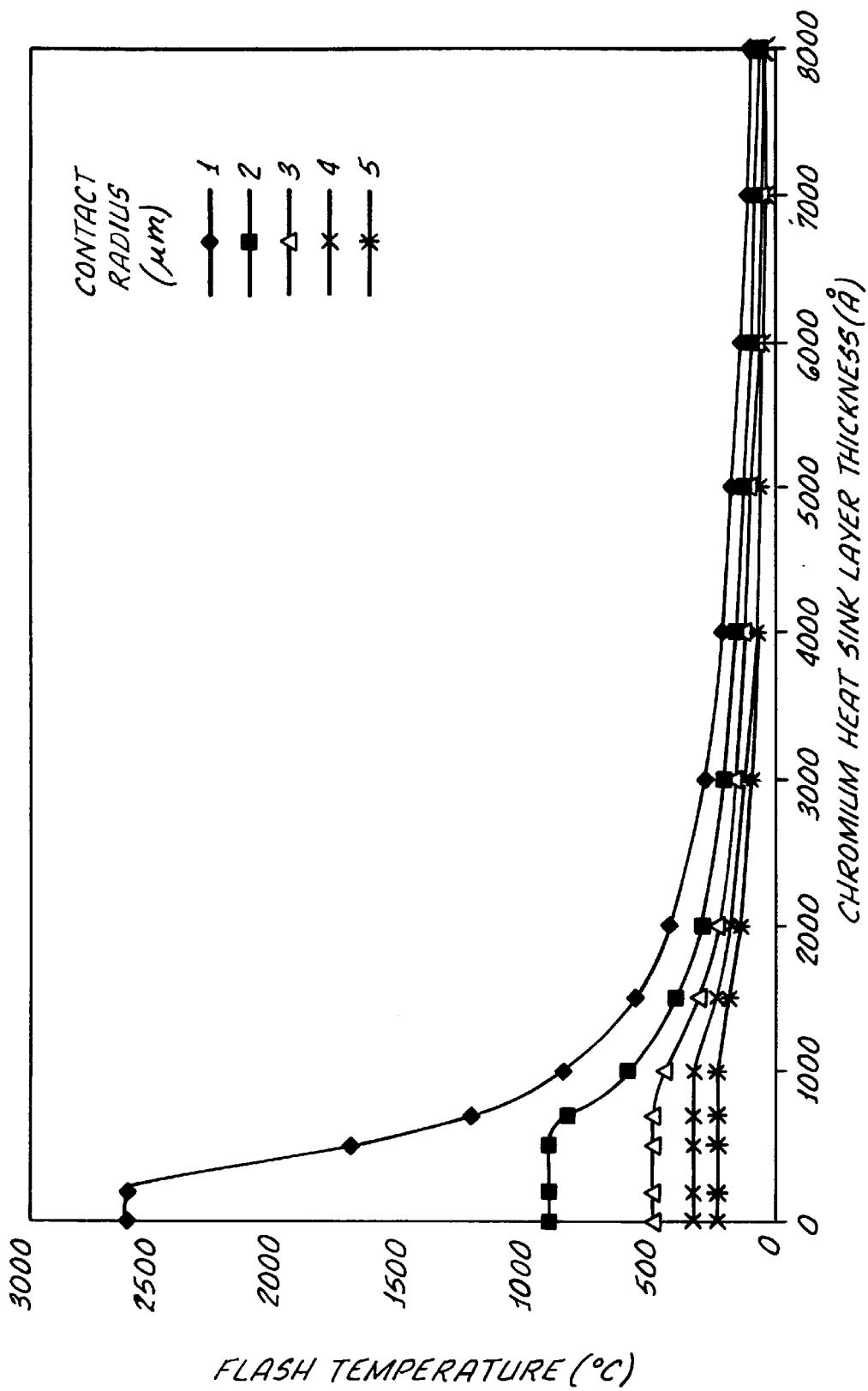
FIG. 3 are plots of flash temperatures as a function of heat sink layer thickness for a number of particles, with a given contact radius, causing head disk interference on a disk; the disk includes a glass substrate and a chromium heat sink layer.

Use of heat sink layer 14 significantly reduces the flash temperature caused, for example, by particles causing the head disk interference. With reference to FIG. 3, using a criterion of a maximum acceptable flash temperature of about 100° C., a chromium heat sink layer should have a thickness greater than about 2000 angstroms for a particle having a contact radius of 5 micrometers (um) to prevent erasure of stored information in magnetic layer 18 in a glass substrate disk. In the plots shown in FIG. 3, the contact force applied to the particle was 1 gram, the velocity of the disk was 15 m/sec, and the coefficient of friction was 0.3. As seen in FIG. 3, the smaller the contact radius of a particle, the greater the flash temperatures generated by the head disk interference.

It should be appreciated that not only does a thicker heat sink layer reduce the maximum flash temperature, but in addition, reduces the duration of time that such elevated temperatures persist following a head disk interference.

Figure 4:
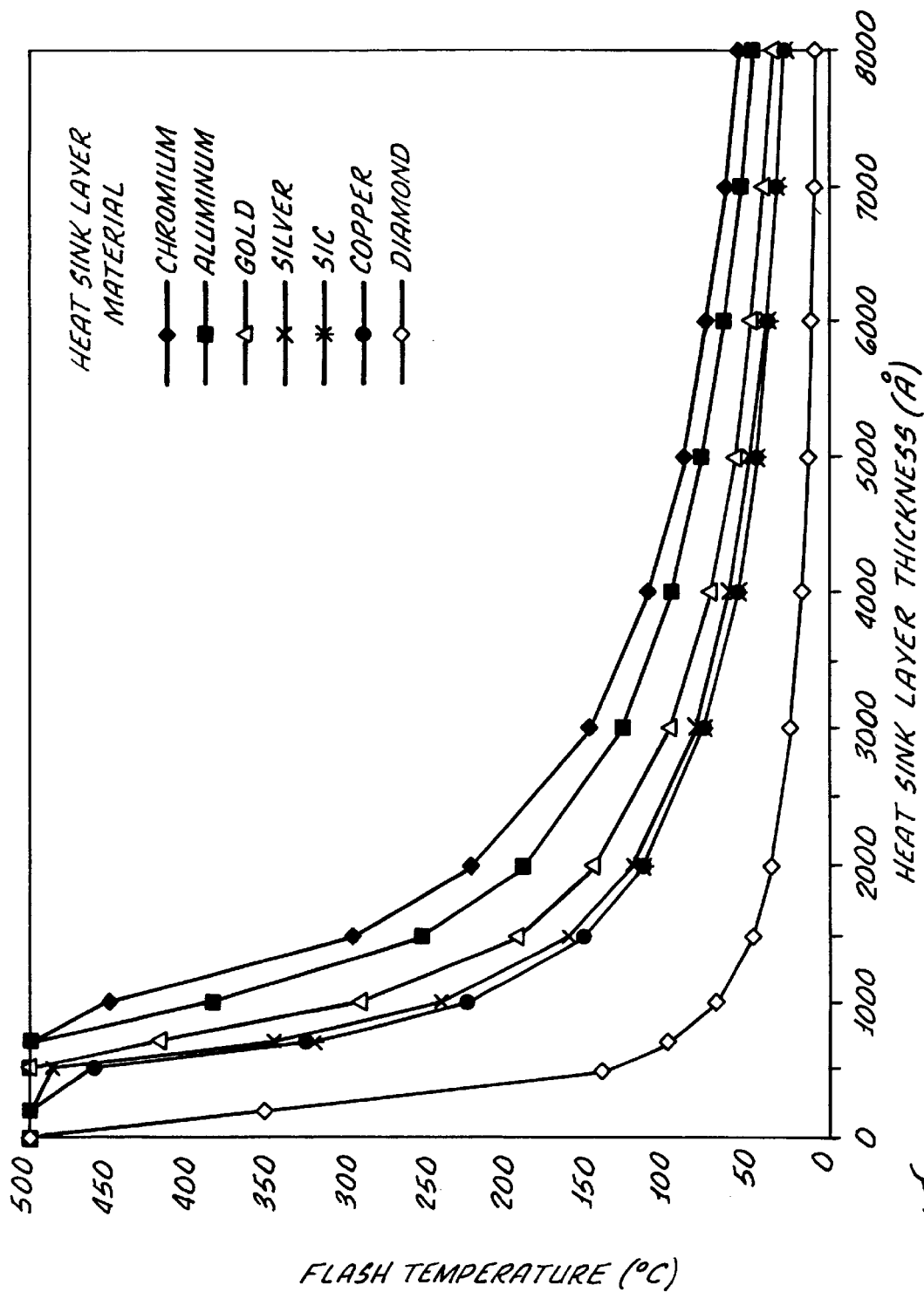
FIG. 4 are plots of flash temperatures as a function of heat sink layer thickness for different heat sink layer materials in disks having glass substrates.

A comparison of calculated flash temperatures for different materials that may be used in the heat sink layer is shown in FIG. 4. With reference to FIG. 4, plots of flash temperatures as a function of heat sink layer thickness for chromium, aluminum, gold, silver, SiC, copper and diamond are shown. The contact force was 1 gram, sliding velocity of the disk was 15 m/sec, coefficient of friction was 0.3, and the contact radius was 3 um. Generally, for a given thickness of the heat sink layer, the higher the thermal diffusivity of a material, the lower the flash temperature that results from a head disk interference. As seen in FIG. 4, for a given material such as diamond, flash temperature decreases as the thickness of the material increases.

Figure 5:
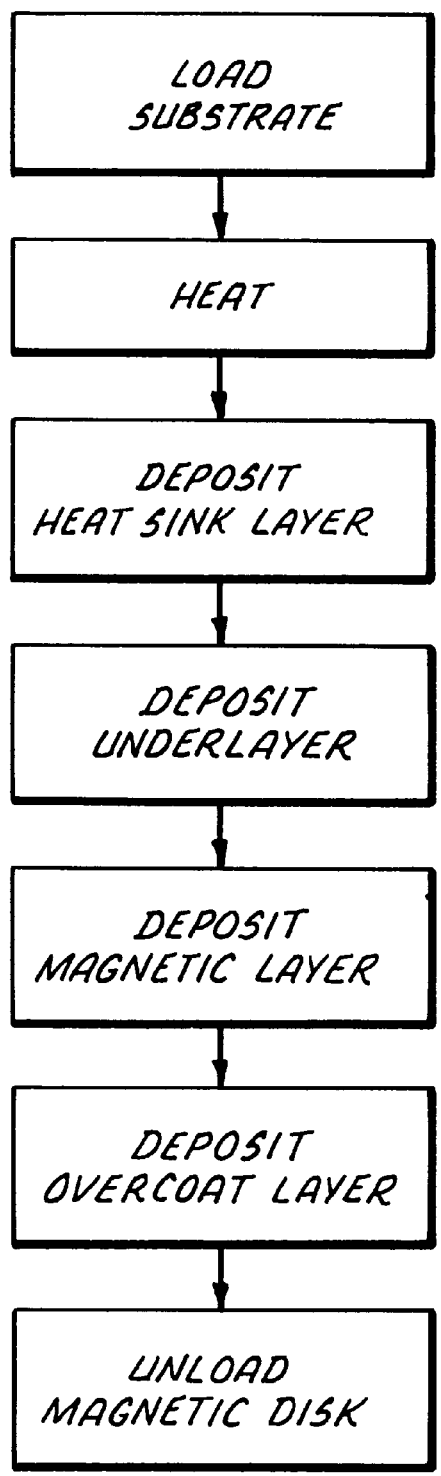
FIG. 5 is a flow diagram illustrating a method of making a magnetic disk in accordance with this invention.

A method of making magnetic disk 10 in accordance with this invention is generally outlined in FIG. 5. The method includes loading substrate 12 into a suitable apparatus at 30. Substrate 12 is heated at 32 to a suitable temperature in the range of about 180° C. to about 220° C. At 34, heat sink layer 14 is deposited above substrate 12. Underlayer 16 is then deposited above heat sink layer 14 at 36 with the underlayer 16 having a thickness of between about 200 and about 400 angstroms. Magnetic layer 18 is then deposited at 38 above underlayer 16. Overcoat layer 20, which may be carbon, is then deposited above the magnetic layer 18 at 40 and magnetic disk 10 is unloaded at 42. Typically, additional processing is applied to magnetic disk 10 after step 42 such as adding a lubricant above overcoat layer 20 and finishing the disk by cleaning and inspecting the disk.

Any suitable deposition techniques may be employed such as sputtering, vapor deposition, or plasma assisted chemical conversion. The above method may be practiced in a suitable apparatus such as a stationary sputtering machine which includes a plurality of chambers for performing the steps outlined above such as steps 32–40. For example, the sputtering machine includes robotic arms which are used to load the substrate and unload the magnetic disk. The loaded substrate is then transported to each chamber and held stationary for per-stage processing which typically lasts approximately 5 to 7 seconds per stage. Per-stage processing includes sputtering the heat sink layer on both sides of the substrate by using suitable targets. For example, a chromium heat sink layer is sputtered above the substrate by using chromium targets on each side of the substrate. The thickness of the chromium heat sink layer is dependent on factors such as the length of the sputtering time per chamber. One chamber or a plurality of chambers may be used to sputter tie layers such as the heat sink layer.

Plasma assisted chemical conversion may be implemented by placing a glass substrate in a chamber and filling the chamber with a gas such as $C_2H_4$. Ions generated by the gas chemically react with silicone-oxide on a surface of the glass substrate thereby forming a thin layer of silicon-carbide as a heat sink layer above the substrate.

This invention provides for a magnetic disk using a substrate of low thermal diffusivity, such as glass, while at the same time preventing erasure of stored information on a disk. This is accomplished by conducting heat generated by head disk interferences away from the site of head disk interference via a heat sink layer so that the localized temperature in a magnetic layer does not exceed that necessary to cause erasure of stored information.

We claim:

1. A magnetic disk for use with a flying magnetic head, the disk and head subject to head disk interference which may cause an erasure of stored information on the disk generated by a rise in localized temperature in the disk, the disk comprising:

a substrate having a thermal diffusivity of less than about $2 \times 10^{-6}$ m$^2$/sec;

a magnetic layer for storing information which is subject to erasure upon such rise in localized temperature generated by the head disk interference;

an underlayer below the magnetic layer for orienting crystalline structure of the magnetic layer; and a heat sink layer directly above the substrate and directly below the underlayer, the heat sink layer having a single material and having sufficient thermal diffusivity and sufficient thickness for dissipating heat generated by the rise in localized temperature caused by the head disk interference to prevent the erasure of stored information in the magnetic layer.

2. The magnetic disk according to claim 1 wherein the magnetic layer has a thickness of between about 50 angstroms and about 500 angstroms and the heat sink layer has a thickness of between about 100 angstroms and about 10,000 angstroms.

3. The magnetic disk according to claim 2 wherein the substrate comprises glass and the thermal diffusivity of the heat sink layer is greater than $24 \times 10^{-6}$ m$^2$/sec.

4. The magnetic disk according to claim 3 wherein the single material comprises chromium, silicon carbide, diamond, aluminum, copper, or silver.

5. The magnetic disk according to claim 4 further comprising:

an overcoat layer above the magnetic layer for protecting the magnetic layer.

6. The magnetic disk according to claim 1 wherein the sufficient thickness of the heat sink layer prevents a flash temperature, due to head disk interference, on the magnetic layer from exceeding about 100° C.

7. The magnetic disk according to claim 6 wherein the substrate comprises glass.

8. The magnetic disk according to claim 7 wherein the single material comprises chromium.

9. A magnetic disk for use with a flying magnetic head, the disk and head subject to head disk interference which may cause an erasure of stored information on the disk generated by a rise in localized temperature in the disk, the disk comprising:

a substrate having a thermal diffusivity of less than about $2 \times 10^{-6}$ m$^2$/sec;

a magnetic layer for storing information which is subject to erasure upon such rise in localized temperature generated by the head disk interference;

an underlayer below the magnetic layer for orienting crystalline structure of the magnetic layer; and a heat sink layer directly above +the substrate and directly below the underlayer, the heat sink layer having a single material and having a thermal diffusivity greater than $24 \times 10^{-6}$ m$^2$/sec and sufficient thickness for dissipating heat generated by the rise in localized temperature caused by the head disk interference to prevent the erasure of stored information in the magnetic layer.

10. The magnetic disk according to claim 9 wherein the single material comprises chromium, silicon carbide, diamond, aluminum, copper, or silver.

11. The magnetic disk according to claim 10 wherein the sufficient thickness of the heat sink layer prevents a flash temperature, due to head disk interference, on the magnetic layer from exceeding about 100° C.

12. The magnetic disk according to claim 11 wherein the heat sink layer has a thickness of between about 100 angstroms and about 10,000 angstroms.

13. A method of making a magnetic disk for use with a flying magnetic head, the disk and head subject to head disk interference which may cause an erasure of stored information on the disk generated by a rise in localized temperature in the disk, the method comprising the steps of:

provic a substrate having a thermal diffusivity of less than about $2\times10^{-6}$ m$^2$/sec;

depositing a heat sink layer having a single material and having sufficient thermal diffusivity and sufficient thickness directly above the substrate;

depositing an underlayer directly above the heat sink layer for orienting crystalline structure of a magnetic layer; and depositing the magnetic layer above the underlayer, the magnetic layer for storing information which is subject to erasure upon such rise in localized temperature generated by the head disk interference;

wherein the heat sink layer is for dissipating heat generated by the rise in localized temperature caused by the head disk interference to prevent the erasure of stored information in the magnetic layer.

14. The method according to claim 13 wherein the step of depositing the magnetic layer includes depositing the magnetic layer with a thickness of between about 50 angstroms and about 500 angstroms.

15. The method according to claim 14 wherein the step of depositing the heat sink layer includes depositing the heat sink layer with a thickness of between about 100 angstroms and about 10,000 angstroms.

16. The method according to claim 15 wherein the thermal diffusivity is greater than $24\times10^{-6}$ m$^2$/sec.

17. The method according to claim 16 wherein the step of providing a substrate includes providing a glass substrate.

18. The method according to claim 17 wherein the step of depositing the heat sink layer includes depositing chromium, silicon carbide, diamond, aluminum, copper, or silver.

19. The method according to claim 13 wherein the sufficient thickness of the heat sink layer prevents a flash temperature, due to head disk interference, on the magnetic layer from exceeding about 100° C.

20. A method of making a magnetic disk for use with a flying magnetic head, the disk and head subject to head disk interference which may cause an erasure of stored information on the disk generated by a rise in localized temperature in the disk, the method comprising the steps of:

providing a substrate having a thermal diffusivity of less than about $2\times10^{-6}$ m$^2$/sec;

depositing a heat sink layer having a single material and having a thermal diffusivity greater than $24\times10^{-6}$ m$^2$/sec and sufficient thickness directly above the substrate;

depositing an underlayer directly above the heat sink layer for orienting crystalline structure of a magnetic layer; and depositing the magnetic layer above the underlayer, the magnetic layer for storing information which is subject to erasure upon such rise in localized temperature generated by the head disk interference;

wherein the heat sink layer is for dissipating heat generated by the rise in localized temperature caused by the head disk interference to prevent the erasure of stored information in the magnetic layer.

* * * * *